United States Patent

[11] 3,619,125

[72] Inventors: Robert Alan Porwancher, Wilmette; Karl Maurice Beck, Bluff, both of Ill.
[21] Appl. No.: 764,319
[22] Filed: Oct. 1, 1968
[45] Patented: Nov. 9, 1971
[73] Assignee: Abbott Laboratories, North Chicago, Ill.

[51] Int. Cl. .................................................. C23f 11/16
[50] Field of Search .......................................... 252/391, 149, 8.55 C, 8.55 E, 395; 21/2.7, 2.5; 260/79.5; 208/47

[56] References Cited
UNITED STATES PATENTS
| | | | |
|---|---|---|---|
| 3,216,857 | 11/1965 | Duvall | 252/149 |
| 3,338,876 | 8/1967 | Kanavel | 260/79.5 |

Primary Examiner—Richard D. Lovering
Assistant Examiner—Irwin Gluck
Attorney—Robert L. Niblack

[54] METHOD OF INHIBITING ACIDIC CORROSION WITH CYCLOHEXYLTHIOUREAS
1 Claim, No Drawings

[52] U.S. Cl. .................................................. 21/2.7, 21/2.5, 208/47, 252/8.55 C, 252/8.55 E, 252/149, 252/391, 252/395

ABSTRACT: Inhibiting corrosion of metals in contact with aqueous solutions having a pH <7 is accomplished by the addition of from 0.2 to 0.0002 percent of 1,3-dicyclohexyl-2-thiourea or cyclohexyl-2-thiourea to the potentially corrosive solution.

METHOD OF INHIBITING ACIDIC CORROSION WITH CYCLOHEXYLTHIOUREAS

DISCLOSURE

This invention relates to a novel method for inhibiting the corrosion of metal bodies in contact with brines or acids. More particularly, this invention relates to methods for retarding the rate of oxidation of ferrous metals and aluminum that are in contact with solutions having a pH<7. In particular, this invention deals with protecting metal bodies against corrosion caused either by the aqueous acid solutions used for metal pickling and oil well acidizing operations or by the water solutions of acid gases such as $CO_2$ and $H_2S$ and inorganic salts present in producing oil and gas wells, secondary recovery injection wells, and petroleum storage and refinery facilities.

In these and other industrial applications, metals, especially the carbon steels and aluminum, are often exposed to potentially damaging corrosive solutions. In pickling operations, for example, the mill scale resulting from hot mill operations must be removed in order to prepare the surface for subsequent electroplating, galvanizing or like coating treatments. Removal of this oxide scale is achieved by immersing the metal into an aqueous acidic bath, usually sulfuric acid, although hydrochloric, nitric and acetic acids are sometimes used.

In oil field acidizing operations, acids, usually hydrochloric and hydrofluoric acids, are injected through the steel well tubing into an oil-producing formation to dissolve carbonates and silicates and open additional channels for oil flow into the well bore.

In petroleum production and storage, brine present in varying degrees contains various dissolved salts such as alkali and alkaline earth chlorides, sulfates, carbonates and bicarbonates, in addition to dissolved gases and fatty acids. This brine originates both from the oil-bearing formation and those solutions that are deliberately injected through well casings to rejuvenate a field. It can either condense as vapor on metal surfaces or accumulate as bottom hole water. Bottom hole waters are buffered by dissolved salts, but condensed water vapor can have a pH as low as 4.

A great deal of work has been done to develop inhibitors that protect these metal surfaces that are exposed to such liquids from deterioration. While theories have been developed to explain the corrosion process, the discovery of worthwhile inhibitors having practical industrial application has been and still is largely an art.

The inhibitors used in the prior art possess various disadvantages. Among these are that dissolution of the inhibitor is slow or incomplete; contact with inhibitor or fumes produced during use, especially of amine inhibitors, is objectionable and not well tolerated by workers; and when high concentrations of inhibitor are required, dissipation during use can reduce concentration below an inhibitory level.

In accordance with the principles of this invention the corrosion of ferrous and aluminum metals is retarded by incorporating into a corrosive solution an inhibitor selected from the group consisting of 1,3-dicyclohexyl-2-thiourea and cyclohexyl-2-thiourea.

These are known compounds and they can easily and conveniently be prepared by the addition of ammonia or to cyclohexylisothiocyanate according to the following reactions:

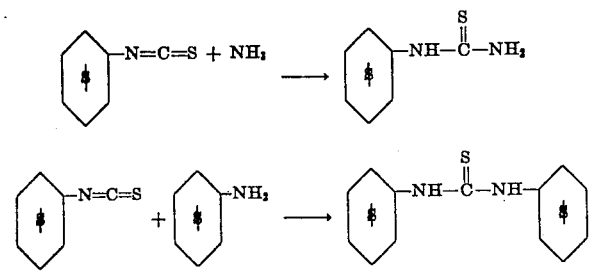

The reactions are rapid and can easily be carried out in an aqueous medium.

In oilfield operations, the inhibitor of this invention can be added to flowing pumping, or gas lift wells continuously or intermittently by any of the prior art schemes. When introducing inhibitor into producing wells having an open casing, the inhibitor is preferably injected by means of a pump into the casing tube annulus. It is then most convenient to first dissolve the inhibitor in a suitable solvent, such for example as ethyl, methyl, or isopropyl alcohol.

Of course, in these instances where the casing annulus is packed off from the tubing, the inhibitor must be introduced through the well tubing. A solution of the inhibitor can be poured directly into the tubing to fall to the bottom of the well. Alternatively, solid particles or a "stick" comprising inhibitor and binders can be dropped into the tubing. After falling to the well's bottom these particles melt or disintegrate to release inhibitor. Preferred binders include lead oxide, petroleum wax, or asphalt. Other binders known in the art that are inert to chemical reaction with the inhibitor are also suitable.

In oil refinery and storage applications, solutions of the inhibitor can be introduced into pipelines, condensers, storage tanks and other places where protection against the corrosive effects of brines and aqueous acids is desired.

The inhibitors of this invention can be added directly to pickling baths without prior dissolution. Yet care must be taken that pickling operations are not started until agitation has dissolved sufficient inhibitor to yield an inhibitory concentration uniformly throughout the bath.

The percent inhibition of an inhibitor is customarily determined from controlled comparison between the effect of a corrosive solution on a metal sample or coupon and the effect of this corrosive solution, but with inhibitor added, on a similar coupon under like conditions of time and temperature. This comparison is expressed in terms of the following formula $$E = (Wo - Wi)/Wo \times 100$$

where $E$ represents percent inhibition, $Wo$ represents the weight loss of the metal coupon immersed in the uninhibited solution and $Wi$ represents the weight loss of the coupon immersed in the inhibited corrosive solution.

Although the amount of inhibitor corrosive solution.

Although the amount of inhibitor that is required to provide greater than 90 percent inhibition is from about 0.2 percent to about 0.005 percent by weight of total solution, the upper limit is not critical. Furthermore, excellent inhibition is achieved when as little as 0.0002 percent inhibitor included in the corrosive solution. It is often desirable to calculate the amount of inhibitor on a basis of 0.01 percent for example. Then if addition of brine or acid solution should dilute the original solution, the concentration of inhibitor will still remain at an inhibitory level. In baths where the concentration of inhibitor can be monitored, a great economic saving can be realized since the inhibitors of this invention achieve inhibition at a lower concentration than those inhibitors presently in commercial use.

Experimental results show that the method of including these thiourea compounds in a corrosive solution is remarkably effective in inhibiting the corrosion of ferrous metals and aluminum by acid solutions. All of the tests described in the following examples were conducted on coupons of 1,100 aluminum alloy measuring 1×2×0.031 inches and 1,010 cold-rolled steel measuring 1×2×0.036 inches. The coupons were first cleaned by hand scrubbing both sides with a rag saturated with acetone and pumice until all the surfaces were free of dirt and oxides. The coupons were then wiped free of any pumice residue, dried and weighed.

After this, the coupons were immersed in test solutions of the designated composition and inhibitor concentration for the specified period, and at room temperature. They were then removed, rinsed with water, dried and reweighed. The percent inhibition obtained at varying concentrations in a number of corrosive solutions is set forth below.

EXAMPLE I

10% by Weight H₂SO₄

|  | steel | Aluminum |
|---|---|---|
| Wt. loss control sample | 0.7382 g. | 0.0668 g. |
| Exposure period | 24 hours | 192 hours |
| % Concentration | % Inhibition | |
| Cyclohexyl-2-thiourea | Steel | Aluminum |
| 0.2 | 82.9 | 46.3 |
| 0.1 | 99.8 | 43.6 |
| 0.08 | 99.0 | 36.1 |
| 0.06 | 99.8 | 24.1 |
| 0.04 | 99.0 | 24.1 |
| 0.02 | 99.8 | 26.1 |
| 0.004 | 98.1 | 41.6 |
| 0.002 | 96.6 | 30.3 |
| 0.0006 | 89.0 | 31.6 |
| 0.0004 | 74.3 | 12.9 |
| 0.0002 | 32.8 | 8.7 |
| 1,3 dicylohexyl-2-thiourea | | |
| 0.01 | 93.8 | 2.0 |
| 0.0004 | 91.9 | 7.0 |
| 0.0002 | 55.8 | 8.4 |

EXAMPLE II

10% by Weight H₃PO₄

|  | Steel | Aluminum |
|---|---|---|
| Wt. loss control sample | 0.2216 g. | 0.1294 g. |
| Exposure period | 20 hours | 44 hours |
| % Concentration | % Inhibition | |
| Cyclohexyl-2-thiourea | Steel | Aluminum |
| 0.2 | 97.3 | 36.4 |
| 0.1 | 97.4 | 33.4 |
| 0.08 | 97.3 | 26.8 |
| 0.06 | 97.3 | 29.2 |
| 0.04 | 97.6 | 29.5 |
| 0.02 | 97.3 | 26.2 |
| 0.008 | 96.4 | |
| 0.006 | 95.9 | |
| 0.004 | 95.5 | |
| 0.002 | 94.5 | |
| 0.0006 | 80.8 | 13.7 |
| 0.0004 | 71.4 | 2.1 |
| 0.0002 | 81.9 | 6.8 |
| 1,3-dicyclohexyl-2-thiourea | | |
| 0.01 | 94.8 | 67.0 |
| 0.0006 | 94.4 | 48.6 |

EXAMPLE III

10% by Weight HCl

|  | Steel | Aluminum |
|---|---|---|
| Wt. loss control sample | 0.2349 g. | 0.4139 g. |
| Exposure period | 20 hours | 8 minutes |
| % Concentration | % Inhibition | |
| Cyclohexyl-2-thiourea | Steel | Aluminum |
| 0.2 | 97.1 | 99.3 |
| 0.1 | 96.9 | 99.3 |
| 0.08 | 97.0 | 99.8 |
| 0.06 | 97.3 | 97.6 |
| 0.04 | 97.2 | 95.9 |
| 0.02 | 96.9 | 96.9 |
| 0.008 | 95.6 | 99.2 |
| 0.006 | 95.5 | 98.6 |
| 0.004 | 94.6 | 98.3 |
| 0.002 | 88.8 | 98.6 |
| 0.0006 | 84.3 | |
| 0.0004 | 66.3 | |
| 0.0002 | 18.8 | 98.7 |
| 1,3 dicyclohexyl-2-thiourea | | |
| 0.1 | 96.4 | 99.9 |
| 0.0006 | 89.5 | 99.2 |
| 0.0004 | 90.6 | 65.4 |
| 0.0002 | 25.3 | 16.8 |

We claim:
1. A method of inhibiting the corrosive action of aqueous brine and solutions comprising sulfuric and hydrochloric acid on ferrous and aluminum metal bodies which comprises maintaining said corrosive solutions and in contact with the metal body at least one thiourea compound selected from the group consisting of 1,3-dicyclohexyl-2-thiourea and cyclohexyl-2-thiourea in a concentration of from 0.2 to 0.0002 percent by weight.

* * * * *